United States Patent
Kohler

(10) Patent No.: US 7,679,637 B1
(45) Date of Patent: Mar. 16, 2010

(54) TIME-SHIFTED WEB CONFERENCING

(76) Inventor: Jeffrey Alan Kohler, 6880 156th Pl., NE., Redmond, WA (US) 98052

( * ) Notice: Subject to any disclaimer, the term of this patent is extended or adjusted under 35 U.S.C. 154(b) by 82 days.

(21) Appl. No.: 11/973,219

(22) Filed: Oct. 5, 2007

Related U.S. Application Data

(60) Provisional application No. 60/855,076, filed on Oct. 28, 2006.

(51) Int. Cl.
  *H04N 7/14* (2006.01)
(52) U.S. Cl. .............................. 348/14.01; 379/202.01
(58) Field of Classification Search ... 348/14.01–14.08; 379/202.01; 341/61; 370/260; 704/503
  See application file for complete search history.

(56) References Cited

U.S. PATENT DOCUMENTS

| | | | |
|---|---|---|---|
| 6,278,387 B1 * | 8/2001 | Rayskiy ...................... 370/260 |
| 6,298,129 B1 * | 10/2001 | Culver et al. ............ 379/202.01 |
| 6,847,778 B1 * | 1/2005 | Vallone et al. ................. 386/68 |
| 6,906,741 B2 * | 6/2005 | Canova et al. ............ 348/14.08 |
| 6,967,599 B2 * | 11/2005 | Choi et al. ..................... 341/61 |
| 7,466,334 B1 * | 12/2008 | Baba ........................ 348/14.06 |
| 2002/0165721 A1 * | 11/2002 | Chang ......................... 704/503 |
| 2006/0146124 A1 * | 7/2006 | Pepperell et al. ......... 348/14.08 |
| 2008/0247730 A1 * | 10/2008 | Barton et al. ................. 386/83 |

* cited by examiner

*Primary Examiner*—Curtis Kuntz
*Assistant Examiner*—Maria El-Zoobi

(57) ABSTRACT

A web conferencing system which, in one aspect has time-shifting capabilities. Session content is recorded so that participants are able to observe the session in real-time, delayed while the session is still in progress, or after the session has completed. Participants are also able to observe the session at normal, slower, or faster speeds, while maintaining substantially consistent perceived audio quality.

9 Claims, 5 Drawing Sheets

FIG. 3

Variables

```
m_fPaused            //indicates if playback is paused
                     //  (true) or resumed (false)
m_dwTickStart        //indicates system time when current
                     //  playback began
m_dwStartOffset      //indicates presentation time when
                     //  current playback began
m_flRate             //indicates playback rate (1.0 for
                     //  real-time, 2.0 for double...)
```

Functions

```
Pause
    Set m_dwStartOffset to the current presentation time
    Set m_fPaused to true Resume
    Set m_dwTickStart to the current system time
    Set m_fPaused to false Seek
    Set m_dwTickStart to the current system time
    Set m_dwStartOffset to the desired seek position Change Playback Rate
    Set m_dwTickStart to the current system time
    Set m_dwStartOffset to the current presentation time
    Set m_flRate to the desired playback rate Get Current Presentation Time
    if( m_fPaused )
        return m_dwStartOffset
    else
        return ( (current system time - m_dwTickStart)
               * m_flRate ) + m_dwStartOffset
```

FIG.4

```
RetrieveFrames( DWORD dwPresentationTimeRequested,
                UINT  nLastFrameNumberReceived,
                bool  fReceiveAllFrames )
{
      if( nLastFrameNumberReceived == -1 )
      // this would indicate no frames previously received
            fReceiveAllFrames = false;

CAtlArray<SFrameInfo> framesToRetrieve;
      for( size_t i = 0; i < m_receivedFrames.GetCount(); i++ )
      {
            if( m_receivedFrames[i].nFrameNumber > nLastFrameNumberReceived ||
                  nLastFrameNumberReceived == -1 )
            {
                  if( m_receivedFrames[i].dwPresentationTime >
                        dwPresentationTimeRequested )
                  {
                        break;
                  } if( m_receivedFrames[i].fKeyFrame && !fReceiveAllFrames )
                  {
                        framesToRetrieve.RemoveAll();
                  } framesToRetrieve.Add( m_receivedFrames[i] );
            }
      } return framesToRetrieve;
}
```

TIME-SHIFTED WEB CONFERENCING

CROSS-REFERENCE TO RELATED APPLICATIONS

This application claims the benefit of provisional patent application Ser. No. 60/855,076, filed 2006 Oct. 28 by the present inventor.

FEDERALLY SPONSORED RESEARCH

Not applicable

COMPUTER PROGRAM LISTING

A computer program listing appendix is stored on each of two identical compact disks labeled "Copy 1" and "Copy 2" which accompany this specification. Each disk contains computer program listings that illustrate an implementation of the invention. The listings are recorded as IBM-PC MS-Windows compatible files which have the creation dates, sizes (in bytes) and names listed below:

\

| | | |
|---|---|---|
| 10/22/2006 03:58 PM | 2,817 | ReadMe.txt |

\MeetingDemand

| | | |
|---|---|---|
| 07/29/2006 12:19 PM | 1,372 | MeetingDemand.sln |

\MeetingDemand\Common

| | | |
|---|---|---|
| 10/18/2006 09:36 PM | 769 | debughelpers.h |

\MeetingDemand\MDClientApp

| | | |
|---|---|---|
| 10/16/2006 08:39 PM | 9,058 | CameraInput.cpp |
| 10/16/2006 08:39 PM | 1,885 | CameraInput.h |
| 10/16/2006 08:34 PM | 3,211 | ClockCapture.cpp |
| 10/16/2006 08:31 PM | 408 | ClockCapture.h |
| 10/16/2006 08:34 PM | 2,219 | ClockOverlay.cpp |
| 10/16/2006 08:34 PM | 311 | ClockOverlay.h |
| 10/18/2006 10:04 PM | 6,925 | CommunicationMgr.cpp |
| 10/17/2006 10:29 PM | 2,462 | CommunicationMgr.h |
| 10/16/2006 08:50 PM | 1,722 | ConnectDlg.cpp |
| 10/16/2006 08:50 PM | 553 | ConnectDlg.h |
| 10/18/2006 10:08 PM | 13,252 | MDClientApp.cpp |
| 10/18/2006 08:41 PM | 3,021 | MDClientApp.h |
| 10/22/2006 08:24 PM | 7,418 | MDClientApp.rc |
| 10/22/2006 08:25 PM | 8,960 | MDClientApp.vcproj |
| 10/18/2006 10:06 PM | 17,045 | MDClientAppDlg.cpp |
| 10/18/2006 10:06 PM | 2,258 | MDClientAppDlg.h |
| 10/22/2006 08:25 PM | 1,973 | resource.h |
| 10/18/2006 09:33 PM | 3,247 | ScreenCapture.cpp |
| 10/18/2006 09:33 PM | 296 | ScreenCapture.h |
| 10/18/2006 09:58 PM | 1,919 | ScreenDecoder.cpp |
| 10/18/2006 09:58 PM | 1,429 | ScreenDecoder.h |
| 10/18/2006 09:59 PM | 3,136 | ScreenEncoder.cpp |
| 10/18/2006 09:58 PM | 862 | ScreenEncoder.h |
| 10/02/2006 06:10 PM | 211 | stdafx.cpp |
| 10/02/2006 06:10 PM | 3,008 | stdafx.h |
| 10/17/2006 10:33 PM | 4,073 | TSPlaybackMgr.cpp |
| 10/17/2006 10:33 PM | 1,089 | TSPlaybackMgr.h |
| 10/17/2006 08:20 PM | 1,648 | VideoDecoder.cpp |
| 10/16/2006 09:28 PM | 729 | VideoDecoder.h |
| 10/16/2006 09:28 PM | 381 | VideoDecoderBase.h |
| 10/16/2006 09:28 PM | 1,439 | VideoDisplay.cpp |
| 10/16/2006 09:28 PM | 483 | VideoDisplay.h |
| 10/17/2006 10:07 PM | 3,045 | VideoEncoder.cpp |
| 10/16/2006 09:28 PM | 840 | VideoEncoder.h |
| 10/16/2006 09:28 PM | 27 | WebService.h |

\MeetingDemand\MDClientApp\AudioInput

| | | |
|---|---|---|
| 10/16/2006 08:26 PM | 2,272 | sync_simple.h |
| 10/16/2006 08:26 PM | 18,274 | waveIN_simple.cpp |
| 10/16/2006 08:26 PM | 8,004 | waveIN_simple.h |

\MeetingDemand\MDClientApp\AudioOutput

| | | |
|---|---|---|
| 10/18/2006 08:48 PM | 3,647 | AudioOutput.cpp |
| 10/18/2006 08:48 PM | 1,064 | AudioOutput.h |
| 10/18/2006 08:33 PM | 2,288 | DataBuffer.cpp |
| 10/18/2006 08:40 PM | 634 | DataBuffer.h |
| 10/18/2006 08:34 PM | 3,423 | TempoChangingAudioBuffer.cpp |
| 10/18/2006 08:34 PM | 791 | TempoChangingAudioBuffer.h |

\MeetingDemand\MDClientApp\MDWebService

| | | |
|---|---|---|
| 10/05/2006 02:49 PM | 398 | MDWebService.disco |
| 10/17/2006 10:15 PM | 20,636 | MDWebService.wsdl |
| 10/05/2006 02:49 PM | 614 | results.discomap |

\MeetingDemand\MDClientApp\res

| | | |
|---|---|---|
| 07/29/2006 12:19 PM | 402 | MDClientApp.rc2 |

\MeetingDemand\MDWebService

| | | |
|---|---|---|
| 10/17/2006 10:36 PM | 6,992 | index.cpp |
| 10/17/2006 10:14 PM | 2,691 | Index.h |
| 10/17/2006 10:14 PM | 8,176 | MDWebService.cpp |
| 07/29/2006 12:18 PM | 171 | MDWebService.def |
| 10/05/2006 09:36 AM | 281 | MDWebService.disco |
| 10/17/2006 10:14 PM | 7,204 | MDWebService.h |
| 10/17/2006 08:06 PM | 2,038 | MDWebService.htm |
| 07/29/2006 12:18 PM | 2,577 | MDWebService.rc |
| 09/10/2006 02:11 PM | 6,039 | MDWebService.vcproj |
| 07/29/2006 12:18 PM | 439 | resource.h |
| 07/29/2006 12:18 PM | 299 | StdAfx.cpp |
| 07/29/2006 04:40 PM | 1,146 | StdAfx.h |

BACKGROUND

1. Field

The field is web conferencing, specifically the application of time-shifting presentation techniques to the field of web conferencing.

2. Prior Art

Web conferencing systems can be used hold meetings and give presentations where participants are in remote locations. Web conferencing systems allow participants to share content with and observe content from other participants. Typical types of content include screen video data, camera video data, audio data (through computers and through telephones), chat data, documents, and the like The current generation of web conferencing systems is focused primarily on real-time interaction. That is, participants join a virtual meeting at a designated time and are able to present and observe in real time (hereafter synchronously). Secondarily, many web conferencing systems can record the meeting. This allows a participant to observe the content of the meeting after the meeting has concluded.

However current web conferencing systems are unable to enable participants to asynchronously observe a live meeting, i.e., observe a previously recorded part of the meeting while the meeting is still in progress. This is undesirable for several reasons. First, if a participant joins a meeting five minutes late, their only choices are to either observe real-time and simply miss the first five minutes, or wait until the entire meeting has concluded to watch the entire recorded content or a selected part of it. Second, if a participant is observing real-time there is no way for them to pause the content to deal with an interruption, or to easily replay a portion of the content to repeat something they missed. Third, if a participant is observing in real-time and the presenter is moving too quickly, there is no way for the participant to slow the presentation.

A key struggle with using existing web conferencing systems is the organization and scheduling required to ensure that all participants are available and connected before the presentation begins. This leads to great inefficiencies, because some participants will simply have to wait for the rest of the participants to join, and some participants may miss part of the presentation or have to wait until the presentation has completed to observe it in its entirety.

In a separate field, commercial digital video recording services and associated equipment, such as one sold under the trademark TiVo by TiVo, Inc, Alviso, Calif., have paved the way in providing live time-shifting capabilities for television viewing and have begun to affect consumers' expectations. Prior to digital video recorders (DVRs), consumers had limited control over their viewing experience. Consumers could either watch a television show in real-time, or with devices like video cassette recorders they could watch a recorded version of the show after the whole show had finished.

DVRs have empowered consumers by allowing them to time-shift real-time television content.

In yet another field, algorithms have been devised to time-scale manipulate audio content with high fidelity reproduction. These algorithms allow an audio stream to be played back at a faster or slower rate while maintaining other perceived aspects of the audio, such as timbre, voice quality, and pitch.

Audio time-scale modification techniques have been applied to applications such as voice-mail and dictation tape playback, post synchronization of film and video, and playback of recorded content. These techniques have also been employed in adaptive buffering schemes for streaming audio (to speed up or slow down audio playback to maintain an optimal buffer length).

ADVANTAGES

Accordingly several advantages of one or more aspects are to enable several advantageous web conferencing scenarios not previously possible:

- a participant can enter a meeting after it has begun and either begin observing the live content or rewind and see the content that they missed
- a participant can observe a meeting in real-time and be able to pause the content to deal with an interruption
- a participant observing a meeting can easily replay an interesting segment
- a participant can observe a live meeting at slower than real-time to more easily digest the content
- a participant observing on a delay (from joining late, pausing, replaying, etc. . . . ) can observe the content faster than real-time Another advantage of one or more aspects is the mitigation of scheduling problems. A meeting organizer can begin the presentation whenever they are ready. The participants who are available at the time can begin observing immediately in real-time. Participants who join later can immediately begin observing what they missed.

SUMMARY

According to one aspect, a web conferencing system includes time-shifting capabilities which enable participants to observe a session in real-time, delayed while the session is still in progress, or after the session has completed. Participants are also able to observe the session at different playback rates while maintaining substantially consistent perceived aspects of audio quality.

DRAWINGS

Figures

FIG. 3 is a pseudo-code listing of a portion of playback logic used by a client application to determine what presentation time to request from a server, according to one embodiment. This corresponds to playback logic 126 in FIG. 1.

FIG. 4 is a pseudo-code listing of a portion of server logic used to determine what frames to send to a client application based on a presentation time requested, according to one embodiment. This corresponds to server logic 112 in FIG. 1.

DRAWINGS

Reference Numerals

| | |
|---|---|
| 110 | server |
| 112 | server logic |
| 114 | storage |
| 116 | server-side communication |
| 118 | network |
| 120a-120n | client |
| 122 | capture logic |
| 124 | client-side communication |
| 126 | playback logic |
| 128a-128n | stream capture and compression |
| 130a-130n | stream decompression and display |
| 130aud | audio stream decompression and display |
| 210 | audio decompression |
| 212 | audio time-scale modification |
| 214 | audio buffer |
| 216 | audio output |
| 510 | telephony network |
| 520a-520n | telephone |
| 530a-530n | participant |
| 540 | telephony device |

DETAILED DESCRIPTION

Figure 1:
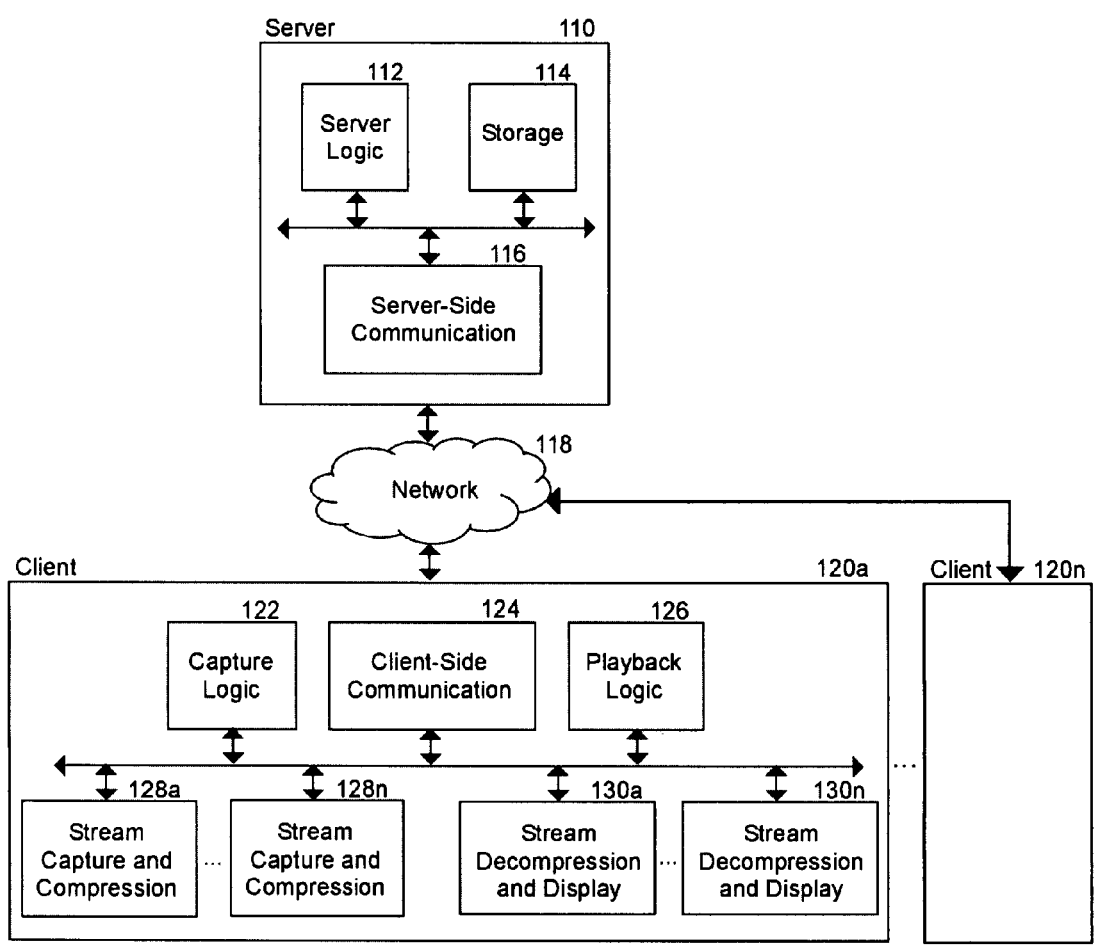
FIG. 1 is a block diagram which illustrates the general organization and main components of an embodiment of a time-shifted web conferencing system.
Figure 2:
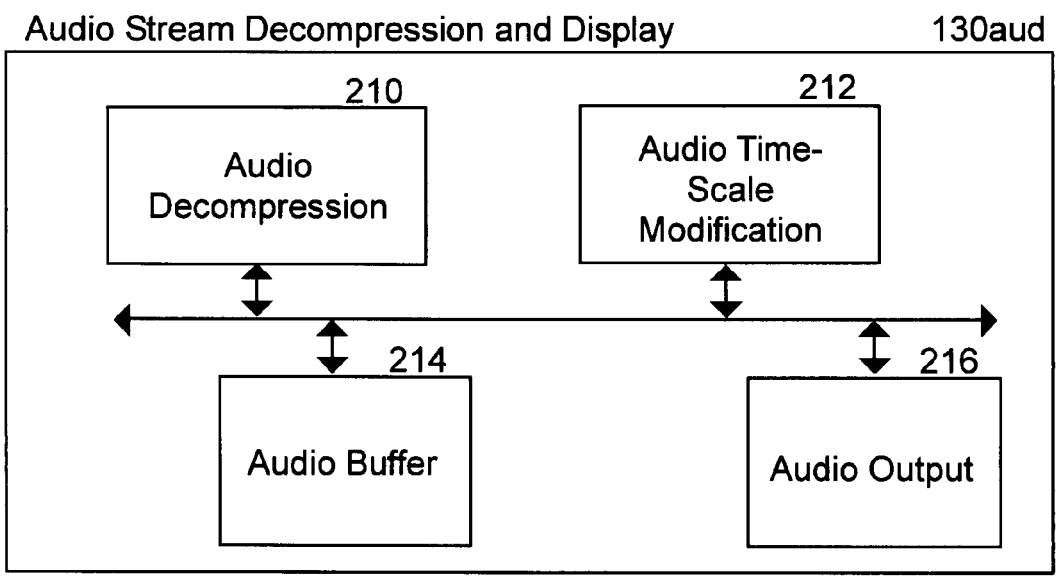
FIG. 2 is a block diagram which illustrates the components responsible for time-shifted playback of audio, according to one embodiment. This diagram represents a specific example of stream decompression and display 130*a*-130*n* in FIG. 1.

First Embodiment—FIGS. 1 and 2

Overview

The general organization and main components of the first time-shifted web conferencing system embodiment are illustrated in FIG. 1. The system is a multi-part software program comprised of a server application 110 running on a computer connected through a network 118 to multiple client applications 120*a*-120*n*, each running on a computer.

Server

Server 110 is responsible for handling and setting up a web conferencing session, receiving and storing streams of data being shared by the client applications 120*a*-120*n*, and sending streams of data to the client applications.

Network

Network 118 is a communications link that facilitates the transfer of content between, for example, the server and client applications. In the first embodiment, the network includes the Internet. It may also include one or more other types of networks, such as a local-area-network, a wide-area-network, a point-to-point dial-up connection, a cell-phone network, and the like.

Client

Client applications 120a-120n run on participants' computers. The client application captures the streams that the participant chooses to share (if any). The client application sends these streams to server 110. The client application also receives the streams from the server that the participant chooses to observe (if any) and displays them. The client application includes a user interface that allows participants to select what streams to share and receive as well as to pause, resume, seek, and adjust the playback rate while observing. In this way a participant can use the client application to share and/or receive.

Streams

In this system, a web conferencing session contains one or more streams. A stream is any type of data that a participant can share or observe. Examples of streams include screen video, camera video, audio (through computers and/or through telephones), documents, collaborative chat, or any other types of data involved in a web conferencing session.

Streams are comprise a series of discrete frames. Frames are time dependent data. Examples of frames include a segment of audio, a single video image, etc. In the first embodiment each frame in a stream is given a sequential number. Frames are given a timestamp that identifies when they occurred in the session. Frames are identified either as key frames, which can be interpreted independently of any other frames, or as delta frames which rely on previous frames.

This key and delta frame scheme is commonly used in the audio visual field, but it can be applied to other types of streams as well. For instance a web page or document shared during a session can be represented as a key frame. Also a white-boarding session (where participants can annotate an image with virtual pens) can be represented as a sequence of frames (where a pen stroke can be a delta frame, etc.).

Sharing Process

The process involved in sharing content in the first embodiment is as follows: Client applications 120a-120n contain two key components for sharing: a capture logic software module 122 and a collection of stream capture and compression components 128a-128n. The capture logic contains information relating to each stream that can be shared. There are different types of stream capture and compression components for each type of data that can be shared. For instance, there is a component type for dealing with screen video, for dealing with camera video, for dealing with audio, etc. Thus the stream capture and compression components constitute a means for sharing data.

In the first embodiment when (if) a participant chooses to share a stream, a capture logic module 122 initializes the appropriate stream capture and compression component 128a-128n. The stream capture and compression component provides stream format information. This information can include the type of stream as well as stream specific format information such as the codec (compression scheme) used, image dimensions, sampling rate, etc. . . . . The client application then needs to notify the server about this new stream. This is accomplished by sending the information to a client-side communication component 124 which passes the information through network 118 to server 110.

The server receives information through a server-side communication component 116. A server logic software module 112 acknowledges the new stream and assigns a unique number to identify the stream. This acknowledgement is passed back to the client through the server-side communication component, network, and client-side communication component.

This arrangement of client-side communication, network, and server-side communication is also used to pass other types of data between the server and the client applications.

During the session, if the participant chose to share streams, frames are captured and compressed by a corresponding component 128a-128n. Capture logic module 122 assigns the frames sequence numbers and time stamps. The frames are then passed to the server.

When the frames reach the server, server logic module 112 puts meta-information about the frame in an index and then records the frame data with storage component 114. In the first embodiment the server logic maintains an index for each stream, and the storage component maintains a file containing the actual frame data for the stream. The index contains an entry for each frame that was received. Each entry contains the meta-information for the frame: frame number, the timestamp of the frame, whether the frame was marked as a key frame or a delta frame, and an offset into the storage file where the data from the frame was stored.

Observing Process

The process involved in observing content in the first embodiment is as follows: Clients 120a-120n receive a list of streams that have been shared through server 110. A participant can then select which of these streams (if any) they would like to observe. When a stream is chosen, an appropriate stream decompression and display component 130a-130n is initialized with format information received from the server. Similar to the stream capture and compression components 128a-128n, there are different types of stream decompression and display components for each type of stream that can be observed.

While a session is being observed, information about what to observe is provided by the playback logic module 126. This information is sent to the server 110. Based on this information, server logic module 112 determines what frames should be returned. The appropriate frames are retrieved from storage unit 114 and returned to the client. The frames are then provided to the appropriate stream decompression and display components 130a-130n which handle decompressing and displaying them. Thus the stream decompression and display components constitute a means for observing data streams.

This process of the client sending information to the server, the server responding with frames, and the client displaying those frames occurs repeatedly as the session is observed.

Capture Logic

With a general overview of the process provided, we can begin to explore individual aspects of the process in more depth.

In the first embodiment capture logic component 122 is responsible for providing sequence numbers and timestamps for each frame that is captured and sent to server 110.

The timestamps given to each frame are relative to the start of the session. For example, a timestamp could indicate that a frame corresponds to a point in time five minutes into the session. Time relative to the start of the session is referred to as presentation time.

Another important time concept is that of local system time. Each of client applications 120a-120n is run on a computer. The client application is able to query the computer's operating system to determine the local time on that computer. This local system time is useful in much of the capture and playback logic.

As part of its responsibilities, capture logic module 122 maintains the following information for each stream that is being shared: the local system time when the stream first started to be shared, the presentation time when the stream first started to be shared, and a count of how many frames have been captured.

When a frame is captured, the capture logic gives it a timestamp (current system time−system time when the stream started to be shared+presentation time when the stream started to be shared). The capture logic also numbers the frame based on how many frames have been captured.

Server Logic

When server 110 receives a frame, it simply stores the frame and its accompanying information. In one embodiment an index is kept by server logic module 112 and the frame data is kept in storage component 114. Thus the server logic module and storage component constitute a means for recording data streams.

The process is slightly more involved when the server receives a request for frames from a client that is requesting to observe streams. When the client requests frames, it sends along the presentation time requested and the streams that it is interested in receiving. Additionally for each stream requested, the client also sends along the number of the last frame (if any) from that stream that the client received.

Server logic module 112 will determine the appropriate frames to send for each stream. A listing of a program for implementing this logic is illustrated in FIG. 4 in the C++ programming language. If the client indicated that they had not received any previous frames for a stream (either because they just started observing, or because of a discontinuity like a seek operation), the server logic will find the key frame with the latest presentation time whose presentation time is less than or equal to the requested presentation time. The server logic will then return that frame and any subsequently numbered frames whose presentation times are less than or equal to the requested presentation time.

In the simplest embodiment, if a client provided the number of the last received frame, the server logic would return any frames with a higher number and a presentation time less than or equal to the requested presentation time.

However, there are advantages to having the server logic be smarter than this. In some cases, having a client receive every single frame is important. This could be the case for an audio stream to prevent audio distortion, for a video stream to provide smoother playback and prevent the appearance of jitter, etc. However, in cases where receiving every single frame is not as important, the ability to skip frames can lead to significant bandwidth savings. The decision to allow frames to be skipped can be made on a stream-by-stream basis (e.g., to prevent audio skipping) or on a request by request basis (e.g., if bandwidth becomes restrained a client could chose to sacrifice smoother playback).

Therefore a more advanced embodiment would allow the client to select between receiving all frames or just those frames necessary to display the stream correctly. If the client chose not to receive all frames and there were no key frames between the last received frame and the requested presentation time, the result will be the same as with the simplest embodiment. If there were one or more key frames, the server would return the key frame with the latest presentation time less than or equal to the requested presentation time and any subsequently numbered frames whose presentation times are less than or equal to the requested presentation time.

Playback Logic

Another point of interest is playback logic module 126, which in the first embodiment is responsible for determining what presentation time to request from server 110 if a participant chose to observe. The playback logic module supports the ability to have the participant perform time-shifting actions such as pausing, resuming, and seeking backward or forward. The playback logic module also supports changing the rate at which content is displayed; i.e., allow the participant to observe at slower than or faster than real-time.

The playback logic module is connected to the client application's user interface. Thus the playback logic module and the client application's user interface constitute an interface means allowing participants to pause, resume, seek, and to adjust the playback rate of streams.

A pseudo-code listing of a program for implementing the playback logic module is displayed in FIG. 3.

In addition to what is shown in the figure, the playback logic is also responsible for remembering the last frame number received for each stream. The last received frame numbers are all initialized to indicate that no frame has been received (in the first embodiment the invalid frame number, −1, is used). The last received frame numbers are updated every time frames are received from the server. In the case of a discontinuity such as seeking (jumping to another point in time), the last received frame numbers would be reset to −1.

Stream Decompression and Display

After frames are received by client 120a-120n, they are sent to one of the stream decompression and display components 130a-130n. For the most part, the workings of these components resemble those of similar components in existing web conferencing or audio video display applications. One aspect worth mentioning is how these components deal with playback rate.

In its simplest embodiment, if a stream decompression and display component received a collection of frames from the server, it could decompress the frames in order and then simply display the last frame.

However, for an increased level of fidelity an improved embodiment would display each frame with the appropriate amount of time between each frame. For example, if an improved stream decompression and display component received two frames whose presentation times differed by one second, the component could decompress both frames, display the first frame, wait one second and then display the second frame. A more advanced embodiment would have the components coordinate with each other and the playback logic to improve synchronization between the streams.

If a participant manipulated the playback rate, the components would simply need to adjust the time between frames accordingly.

Audio Stream Decompression and Display

Certain stream types need a more sophisticate treatment. For instance, without additional care, if the playback rate of an audio stream was adjusted, the pitch would change and the audio would seem distorted. It would be advantageous to be able to adjust the playback rate of the audio stream while maintaining the perceived aspects such as pitch.

FIG. 2 illustrates an embodiment of an audio stream decompression and display component 130aud which addresses the above concerns. It contains an audio decompression component 210, an audio buffer 214 that stores the decompressed audio, and an audio output component 216 responsible for playing the audio.

A point of interest is the audio time-scale modification component 212. This component includes logic for manipulating the time-scale of a stream of audio while maintaining the perceived aspects of audio quality. Example algorithms include the WSOLA algorithm introduced by Verhelst and Roelands, and available at http://ieeexplore.ieee.org/xpl/freeabs_all.jsp?arnumber=319366, or related algorithms. The first embodiment uses Olli Parviainen's open-source SoundTouch library, available at http://www.surina.net/soundtouch/.

As audio is received it is decompressed and placed into buffer 214. As audio is played back, a segment of audio of a certain length is retrieved from the buffer and fed into timescale modification component 212. This produces a resultant segment of audio of the same or different length which is then consumed by audio output 216.

The lengths of the audio segments and the behavior of the time-scale modification component are controlled by the playback rate. For example, in the first embodiment, if the audio output required audio segments 250 milliseconds long and the playback rate was 1.0 (real-time) an audio segment of 250 milliseconds would be retrieved from the buffer. This segment would be fed into the time-scale modification component which would leave it unchanged and return an identical 250 millisecond audio buffer to be output.

Similarly, if the playback rate was 2.0 (twice as fast as real-time), an audio segment 500 milliseconds long would be retrieved from the buffer and fed into the time-scale modification component. The time-scale modification component would adjust the audio and return a 250 millisecond segment to be output.

Physical Configuration

In a typical scenario, the participants 530a-530n who are presenting and observing would be in remote locations. Client applications 120a-120n with which the participants are interacting would be running on personal computers. In the first embodiment, the participants would each be running copies of the same client software application. The client application would have the ability to share (present) data streams as well as observe (view) data streams. In other embodiments, multiple client software applications could be provided that support differing capabilities (e.g., first client application for presenting and second client application for observing).

Server application 110 would be running on server class computer. This computer could be hosted and maintained by a company running the web conferencing system. Alternatively, it could be hosted by a company or organization that one or more of the participants are affiliated with.

In the first embodiment, the client application and server application are implemented in C++.

Additional Embodiments

Additional embodiments incorporating different designs and providing different functions can be provided.

Server Architecture

FIG. 1 shows a single server. However, it is possible and advantageous to have the duties split among a plurality of physical computers and software components. This division would afford scalability, redundancy, and performance advantages.

Multiple servers could be implemented by separating the storage unit 114 from the server logic component 112 and server-side communication component 116 and placing them on separate physical machines. Additionally, multiple physical machines with the same software components could be used. For example, multiple servers could sit behind a load-balancer. As requests came in, the load-balancer could direct the requests to an appropriate server.

Storage

The way that frame data and associated information is stored and retrieved is open to alternatives. In one example the frame meta-information is stored in a relational database. Relational databases can provide performance, scalability, and persistence advantages over storing the meta-information in an in-memory structure or in a file. The frame data could also be stored in a database, on a network attached storage device, or the like.

Client Architecture

In the first embodiment, a single client application is provided for participants to share and/or observe content. In an alternative embodiment, multiple client applications could be provided. Motivations for this could include simplifying or limiting the application used for observation. Also, applications could be provided for different operating systems or platforms. For example, in a Microsoft Windows environment a native application might be required for full capabilities, such as sharing screen data, but an Adobe Flash application might be able to observe and share some types of data.

Communication

In the first embodiment, the client application observes a session by repeatedly making requests to the server for frames. Each request contains the streams requested, and the last frame numbers received for each stream. While this provides an easier implementation, it is not the most high-performing.

A more optimized embodiment could have the server remember the streams that each client is interested in, the playback rate for the client and the last frame numbers sent for each stream to each client. In this embodiment, clients would only need to update the server if something changed; e.g., if different streams are selected, a discontinuity occurred, etc.

Additionally, there are existing advanced audio video broadcasting mechanisms that do not rely on this request/response mechanism. For example, with protocols like the real-time transport protocol (http://tools.ietf.org/html/rfc1889), the server simply continues to send frames to clients and some separate quality of service mechanism informs the server if the frames are reaching their destination. This can lead to performance improvements, including lowered latency. An embodiment could embrace this strategy.

Also, in the first embodiment, the clients all communicate with the server. However, it is conceivable that under certain circumstances it would be advantageous for some of the clients to communicate directly with each other. For example, a client sharing stream data would send the data to the server to be stored. If there was another nearby client attempting to observe this stream data, the second client might be able to receive the data directly from the first client instead of through the server. Other network topologies could be imagined that would have further advantages.

Other Communications Media

In the first embodiment, all stream data is shared and received through a network connection between the client applications and the server. However, there are examples where this could be expanded. For instance, for sharing or receiving audio, a telephone may be a more suitable device than a computer.

Figure 5:
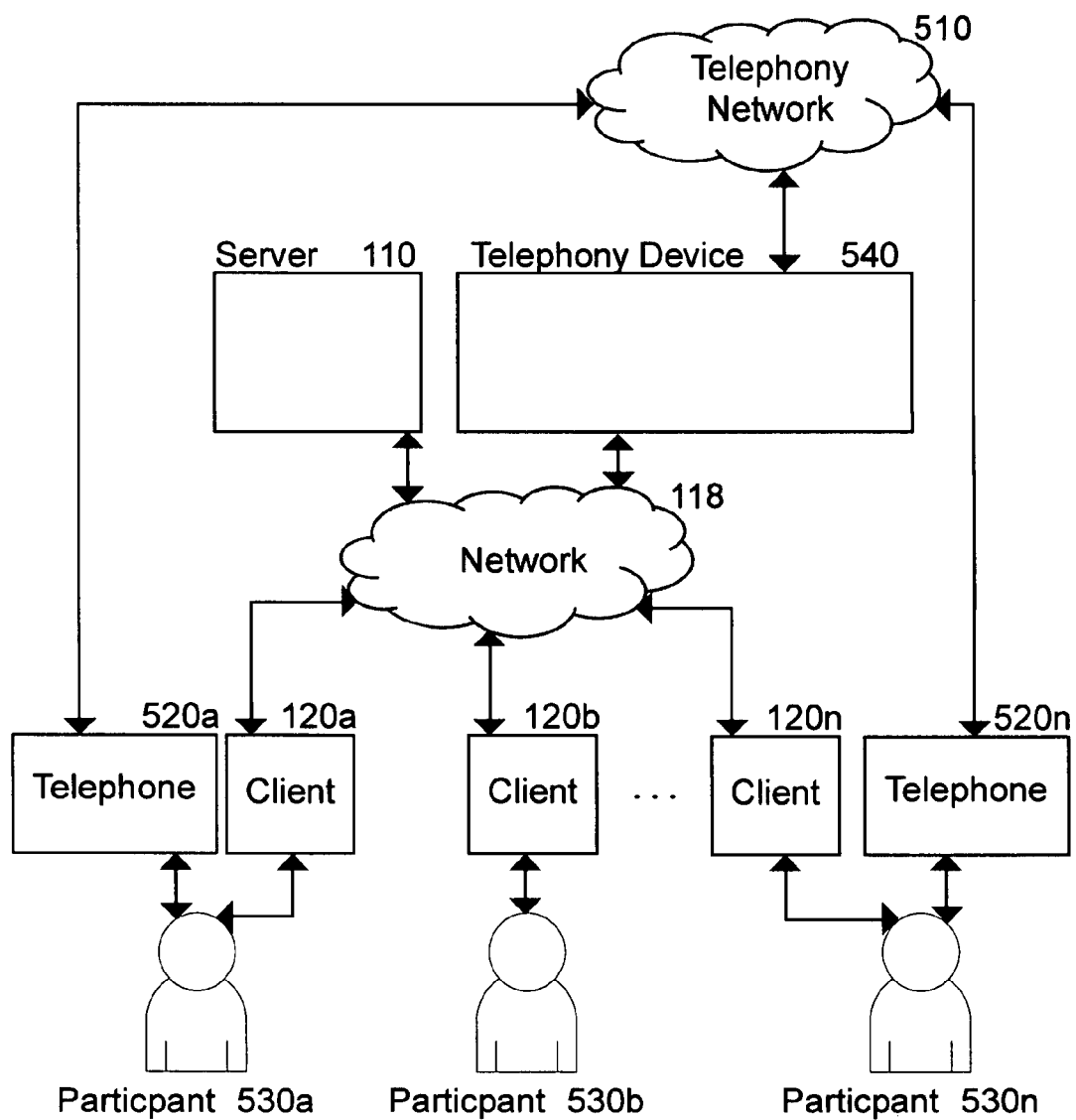
FIG. 5 is a block diagram which illustrates an alternate embodiment of a time-shifted web conferencing system incorporating telephony.

FIG. 5 shows an embodiment that allows participants to share or receive audio through a telephone or through their computer. This embodiment features the addition of a telephony device 540. This device could be a teleconferencing bridge, an Asterisk server (Asterisk is an open source telephony software program capable of interfacing with telephony networks), a computer running a session initiation protocol (SIP) application (SIP is a protocol commonly used to communicate with telephony networks), or the like. The telephony device communicates through network 118 to server 110. The telephony device sends audio data to the server to be stored and retrieves audio data from the server to be sent to participants. The server and telephony device contain logic for compressing and decompressing the audio data. The telephony device is connected to a telephony network 510. This telephony network, which could include the public switched telephone network (PSTN), a private telephone network or the like, connects to telephones 520a-520n. Participants 530a-530n connect to the session using client applications 120a-120n. As in the first embodiment, participants can input and output audio through the client application on their computer. In this embodiment participants also have the option to input and output audio data through their telephone.

In order to support variable speed playback of audio through telephones, some of the logical components introduced with the first embodiment would need to be included in the server application. Before sending audio data to the telephony device, the server would need to decompress it with audio decompression 210, and manipulate it with audio time-scale modification 212.

CONCLUSIONS, RAMIFICATIONS, AND SCOPE

Accordingly, the reader will see that one or more embodiments of time-shifted web conferencing provide several advantageous features. Participants are able to observe content live, delayed while the session is still in progress, or after the session has completed. Additionally, participants are able observe at normal, slower or faster speeds while maintaining substantially consistent perceived aspects of audio quality.

Although the description above contains many specificities, these should not be construed as limiting the scope of any aspect but as merely providing illustrations of some of the presently preferred embodiments. Many other variations are possible and should be considered in the scope. For example the client and server components could run on devices other than computers, clients could maintain a separate local storage of session data, different types of stream data or communication networks could be used, the applications could be organized differently, etc.

Accordingly, the scope should be determined not by the embodiments illustrated, but by the appended claims and their legal equivalents.

I claim:

1. A method of presenting audio data in a web conference comprising:
    (a) providing an input means which allows at least one presenting participant to share audio data,
    (b) providing a storage means which is able to record said audio data and is operatively connected to said input means,
    (c) recording said audio data with said storage means,
    (d) providing an output means which is operatively connected to said storage means and allows at least one observing participant to listen to said audio data,
    (e) providing an interface means which can receive instructions and which allows said observing participant to:
        i. pause, resume, and seek said audio data, and
        ii. adjust the playback rate of said audio data,
    (f) providing a time-scale modification means which is able to maintain substantially consistent perceived audio quality at a plurality of playback rates,
    (g) retrieving said audio data from said storage means in accordance with said instructions given to said interface means,
    (h) manipulating said audio data with said time-scale modification means in accordance with said instructions given to said interface means,
    (i) providing said audio data to said observing participant with said output means,
    whereby said observing participant can provide said instructions to said interface means at the same time that said presenting participant is sharing said audio data, and said audio data from said presenting participant can be simultaneously recorded by and retrieved from said storage means, allowing said observing participant to selectively listen to said audio data live and allowing said observing participant to selectively listen to a previously presented and recorded part of said audio data at a plurality of playback rates at the same time that said presenting participant is sharing said audio data, and said observing participant will perceive substantially consistent audio quality.

2. A web conferencing system comprising:
    (a) a first client application allowing at least one presenting participant to share computer screen video,
    (b) said first client application also being arranged to allow said presenting participant to share at least one data stream selected from the group consisting of chat data, documents, web pages and white-boarding session,
    (c) storage means for recording said computer screen video and said data stream, and
    (d) a second client application allowing at least one observing participant to sense said computer screen video and said data stream live,
    (e) said second client application also being arranged to allow said observing participant to selectively sense a previously presented and recorded part of said computer screen video and said data stream while said presenting participant is sharing a current part of said computer screen video and said data stream,
    (f) said second client application also being arranged to allow said observing participant to selectively sense a previously presented and recorded part of said computer screen video and said data stream after said presenting participant has finished sharing a said computer screen video and, said data stream
    whereby said web conferencing system is able to simultaneously record said computer screen video and said data stream and allow said observing participant to sense current and previously presented parts of said computer screen video and said data stream.

3. The system of claim 2 wherein:
    (a) said first client application allows said presenting participant to share audio data
    (b) said storage means records said audio data, and
    (c) said second client application allows said observing participant to sense said audio data.

4. The system of claim 3 wherein:
(a) said web conferencing system includes an audio time-scale modification component,
(b) said second client application also allows said participant to observe said computer screen video, said data stream, and said audio data at an adjustable rate of speed,
whereby said audio time-scale modification component maintains substantially consistent perceived aspects of audio quality at a plurality of chosen playback rates of speed.

5. The system of claim 4 wherein said second client application also allows said observing participant to perform time-shifting operations comprising pausing, resuming and seeking.

6. The method of claim 1 wherein said audio data is provided to said observing participant in such a way that said observing participant can also provide said instructions to said interface means and listen to said audio data after said presenting participant has finished sharing said audio data.

7. A web conferencing system comprising:
(a) a first client application that allows at least one presenting participant to share data streams comprised of audio data and computer screen video data
(b) a second client application that allows at least one observing participant to sense said data streams
(c) a server application operatively connected to said first client application and to said second client application, said server application arranged to:
  i. receive said data streams from said first client application and record it in a storage device
  ii. retrieve said data streams from said storage device and send it to said second client application
(d) a time-scale modification component operatively connected to said second client application which is able to maintain substantially consistent perceived audio quality at a plurality of playback rates
whereby said data streams from said first client application can be simultaneously recorded by and retrieved from said storage device, and said second client application allows said observing participant to sense said data streams in real-time, and said second client application also allows said observing participant to selectively sense a previously presented and recorded part of said data streams at a plurality of playback rates at the same time that said presenting participant is sharing a current part of said data streams and after said presenting participant has stopped sharing, and said observing participant will perceive substantially consistent audio quality.

8. The system of claim 7 wherein said data streams also include data selected from the group consisting of chat data, documents, web pages and white-boarding session.

9. The system of claim 8 wherein said second client application allows said observing participant to perform time-shifting operations comprising pausing, resuming and seeking said data streams.

* * * * *